(12) United States Patent
Kawasetsu et al.

(10) Patent No.: US 8,376,713 B2
(45) Date of Patent: Feb. 19, 2013

(54) WIND TURBINE ROTOR BLADE

(75) Inventors: Nozomu Kawasetsu, Tokyo (JP); Kentaro Shindo, Tokyo (JP); Takao Kuroiwa, Tokyo (JP); Shinichi Hori, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 7 days.

(21) Appl. No.: 13/208,558

(22) Filed: Aug. 12, 2011

(65) Prior Publication Data

US 2012/0100002 A1  Apr. 26, 2012

Related U.S. Application Data

(63) Continuation of application No. PCT/JP2011/064970, filed on Jun. 29, 2011.

(30) Foreign Application Priority Data

Oct. 22, 2010 (JP) ................................ 2010-237346

(51) Int. Cl.
F03D 1/06 (2006.01)
(52) U.S. Cl. ...................................... 416/226
(58) Field of Classification Search .................. 416/226, 416/132 R, 132 B, 225
See application file for complete search history.

(56) References Cited

U.S. PATENT DOCUMENTS

2009/0116962 A1   5/2009   Pedersen et al.

FOREIGN PATENT DOCUMENTS

| EP | 2105609 A2 | 9/2009 |
|---|---|---|
| JP | 2000064941 A * | 3/2000 |
| JP | 2004-011616 A | 1/2004 |
| JP | 2004011616 A * | 1/2004 |
| JP | 2009052544 A * | 3/2009 |
| JP | 2010-059884 A | 3/2010 |
| WO | 2005/100781 A1 | 10/2005 |
| WO | 2008/084126 A1 | 7/2008 |

OTHER PUBLICATIONS

International Search Report PCT/JP2011/064970 Sep. 27, 2011.

* cited by examiner

*Primary Examiner* — Richard Edgar
(74) *Attorney, Agent, or Firm* — Kanesaka Berner & Partners, LLP

(57) ABSTRACT

Provided is a wind turbine rotor blade that can secure a sufficient strength in a coupling portion without significant increase in weight even though a blade is increased in size because beams, which are main strength members of the separated blades, are coupled to each other by metallic coupling members. A wind turbine rotor blade including: a skin that forms a long hollow shape; and a beam that is vertically passed in a longitudinal direction to reinforce the skin from inside, wherein the beam is separated into at least two portions in the longitudinal direction, and ends of the adjacent beams are coupled to each other through a metallic coupling member having: a first flange portion opposed to the one end; a second flange portion opposed to the other end; and a connecting portion that connects these first flange portion and second flange portion, and the skin is separated into a coupling portion skin arranged at a position corresponding to the coupling member, and a main body skin arranged at a position corresponding to the beam.

9 Claims, 10 Drawing Sheets

WIND TURBINE ROTOR BLADE

RELATED APPLICATIONS

The present application is a continuation of PCT//JP2011/064970, filed Jun. 29, 2011 and claims priority from, Japanese Application Number 2010-237346, filed Oct. 22, 2010, the disclosures of which are hereby incorporated by reference herein in their entirety.

TECHNICAL FIELD

The present invention relates to a wind turbine rotor blade that constitutes a wind turbine for wind power generation.

BACKGROUND ART

In recent years, wind turbines for wind power generation have increased in size to achieve improvement in power generation efficiency and to increase of the amount of power generation. Along with the increase in size of wind turbines for wind power generation, wind turbine rotor blades have also increased in size, to have for example, a blade length of not less than 40 meters.

When the wind turbine rotor blade is increased in size as described above, various difficulties, such as a difficulty in integral manufacture and a difficulty in conveyance along with difficulties in securing roads and trucks, etc., occur.

In order to solve these difficulties, there has been proposed a wind turbine rotor blade that is separated in a longitudinal direction as disclosed in Patent Literature 1.
{Citation List}
{Patent Literature}
{PTL 1}
Japanese Unexamined Patent Application, Publication No. 2004-11616

SUMMARY OF INVENTION

{Technical Problem}

However, an aspect disclosed in Patent Literature 1 is a wind turbine blade structure comprised of a single skin, in which a strength of the structure is secured only by the skin, and in which the skin and a connecting member are connected with bolts in a direction perpendicular to the skin. Therefore, when the wind turbine rotor blade is increased in size, to have for example, the blade length of not less than 40 meters along with the increase in size of the wind turbine for wind power generation, it is necessary to increase a skin thickness in order to secure a sufficient strength of the wind turbine rotor blade, thus resulting in significant increase in weight.

In addition, although an aspect is also disclosed in which skins are connected to each other with bolts in a longitudinal direction, maintainability, such as ease of assembly and disassembly, is still not enough because it is necessary for a worker to enter and work in an internal space of the wind turbine rotor blade in this aspect, and thus further improvement has been required.

The present invention is made in view of the above-described situation, and a main object of the present invention is to provide a wind turbine rotor blade that can prevent breakage in a coupling portion between separated blades.
{Solution to Problem}

The present invention has employed the following solutions for the above-described problem.

A wind turbine rotor blade according to a first aspect of the present invention including: a skin that forms a long hollow shape; and a beam that is vertically passed in a longitudinal direction to reinforce the skin from inside, the wind turbine rotor blade being also radially attached around a rotational axis line of a rotor hub, wherein the beam is separated into at least two portions in the longitudinal direction, and ends of the adjacent beams are coupled to each other through a metallic coupling member having: a first flange portion opposed to one end; a second flange portion opposed to another end; and a connecting portion that connects these first flange portion and second flange portion, and the skin is separated into a coupling portion skin arranged at a position corresponding to the coupling member, and a main body skin arranged at a position corresponding to the beam.

According to the wind turbine rotor blade according to the first aspect, since the beams, which are main strength members of the separated blades, are coupled to each other by the metallic coupling members, a sufficient strength in the coupling portion can be secured without significant increase in weight even though the blade is increased in size.

In the wind turbine rotor blade according to the first aspect, it is more preferred that the coupling member be configured to be coupled to the corresponding end of the beam through a plurality of bolts fixed to the ends of the beams, and nuts screwed to these bolts.

According to such a wind turbine rotor blade, since the coupling member is fixed to the corresponding end of the beam through the bolts and nuts, maintainability, such as ease of assembly and disassembly, can be improved.

In the wind turbine rotor blade according to the first aspect, it is more preferred that end surface shapes of the first flange portion and the second flange portion be the same as opposed end surface shapes of the beams, respectively.

According to such a wind turbine rotor blade, the coupling member and the corresponding end of the beam are connected smoothly, and a load can be transmitted efficiently.

In the wind turbine rotor blade according to the first aspect, it is more preferred that more than half of cross-sectional shapes of the separated beams in the longitudinal direction be the same as or similar to each other.

According to such a wind turbine rotor blade, a preferred beam cross section can be employed easily at each position by setting the most suitable cross-sectional shape (it is not changed complicatedly in the longitudinal direction) for every separated beam.

In the wind turbine rotor blade according to the configuration in which the coupling member is coupled through the bolts and nuts, it is more preferred that one end of the bolt be coupled through a nut embedded in the end of the beam or an insert member.

According to such a wind turbine rotor blade, coming-away of the bolts in an axial direction (in the longitudinal direction of the wind turbine rotor blade) can be prevented more reliably, and thus reliability of the wind turbine rotor blade can be further improved.

In the wind turbine rotor blade according to the first aspect, it is more preferred that the coupling portion skin be fixed to back surfaces and front surfaces of the first flange portion and the second flange portion through a fastening member.

According to such a wind turbine rotor blade, since the coupling portion skin is firmly fixed to the corresponding back surfaces and front surfaces of the first flange portion and the second flange portion of the coupling member, detachment of the coupling portion skin can be prevented.

In the wind turbine rotor blade according to the first aspect, it is more preferred that the coupling portion skin be fixed to the back surfaces and the front surfaces of the first flange portion and the second flange portion, and to a back surface and a front surface of the beam through a fastening member.

According to such a wind turbine rotor blade, since the coupling portion skin is firmly fixed to the corresponding back surfaces and front surfaces of the first flange portion and the second flange portion of the coupling member, and to the corresponding back surfaces and front surfaces of the beams, detachment of the coupling portion skin can be prevented.

In the wind turbine rotor blade according to the first aspect, it is more preferred that a metallic lightning receiving piece arranged at a back surface and/or a front surface of the skin and the coupling member be connected to each other by a conductive cable, and the coupling member and the coupling member be connected to each other by a first down conductor, and also the coupling member and the rotor hub be connected to each other by a second down conductor.

According to such a wind turbine rotor blade, eliminated is a potential difference between the air around the wind turbine rotor blade and the ground on which a foundation of the wind turbine for wind power generation is installed, and thereby the wind turbine is not easily struck by lightning, and additionally, even when the wind turbine is struck by lightning, the conductive cable, the first down conductor, the second down conductor, and a grounding conductor serve as a passage for a current, and thus damage of the wind turbine rotor blade and the wind turbine for wind power generation can be prevented.

In addition, a circuit can be formed easily and reliably at the time of coupling the blades by using the coupling members as electric contact points of the separated respective blades.

A wind turbine for wind power generation according to a second aspect of the present invention includes a wind turbine rotor blade in which beams, which are main strength members of separated blades, are coupled to each other by metallic coupling members.

According to the wind turbine for wind power generation according to the second aspect, the increase in size of the wind turbine rotor blade along with the increase in size of the wind turbine for wind power generation can also be dealt with without significant increase in weight.

{Advantageous Effects Of Invention}

According to the wind turbine rotor blade according to the present invention, since the beams, which are the main strength members of the separated blades, are coupled to each other by the metallic coupling members, an advantageous effect is produced that a sufficient strength in the coupling portion can be secured without significant increase in weight even though the blade is increased in size.

BRIEF DESCRIPTION OF DRAWINGS

FIG. 9(a) is a view showing a flange shape viewed from a second main beam side, FIG. 9(b) is a side view, and FIG. 9(c) is a view showing a flange shape viewed from a first main beam side.

FIG. 10(a) is a view showing a flange shape viewed from a third main beam side, FIG. 10(b) is a side view, and FIG. 10(c) is a view showing a flange shape viewed from the second main beam side.

FIG. 11(a) is a perspective view of a nut, and FIG. 11(b) is an enlarged cross-sectional view showing a main part.

DESCRIPTION OF EMBODIMENTS

Hereinafter, a wind turbine rotor blade according to one embodiment of the present invention will be described with reference to FIGS. 1 to 10.

Figure 1:
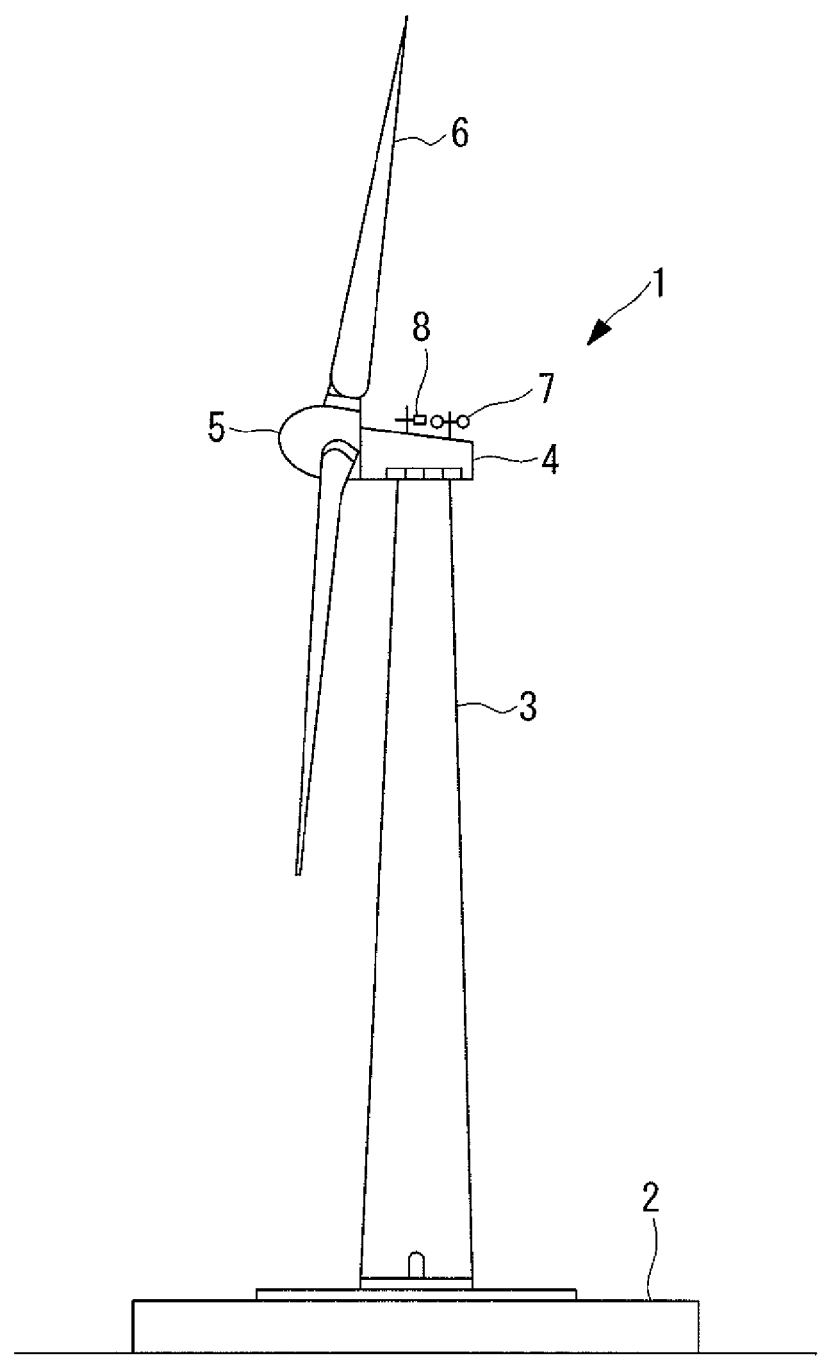
FIG. 1 is a side view showing a wind turbine for wind power generation including a wind turbine rotor blade according to the present invention.
Figure 2:
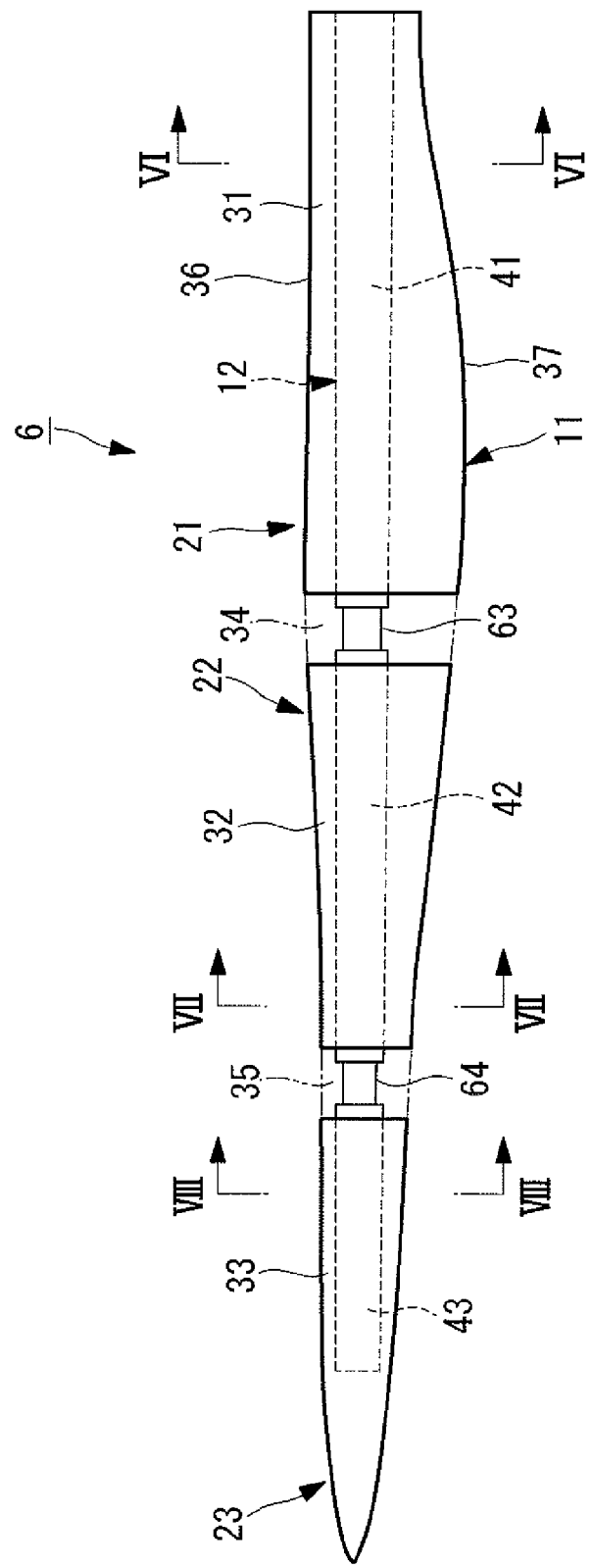
FIG. 2 is a plan view showing a state in the middle of assembly of a wind turbine rotor blade according to one embodiment of the present invention.
Figure 3:
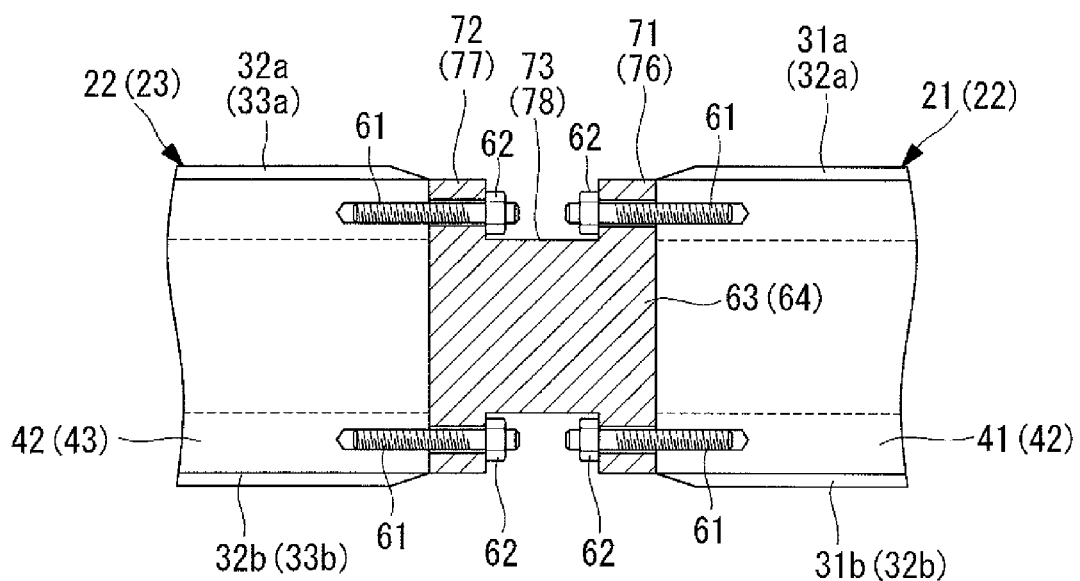
FIG. 3 is an enlarged cross-sectional view of a main part of FIG. 2.
Figure 4:
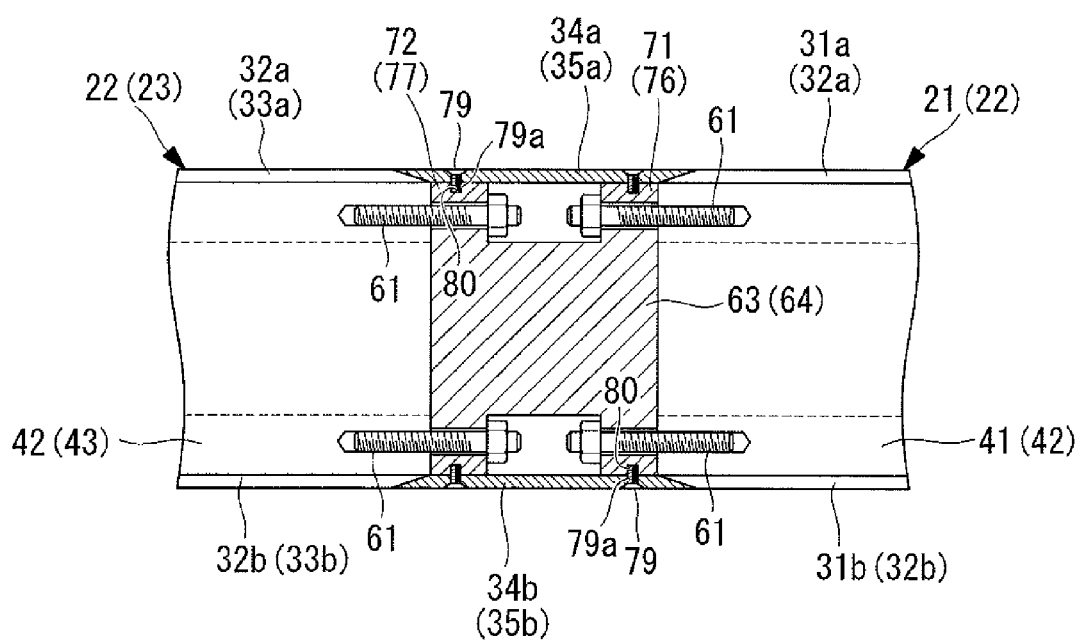
FIG. 4 is a cross-sectional view showing a state after completion of assembly of the wind turbine rotor blade according to one embodiment of the present invention.
Figure 5:
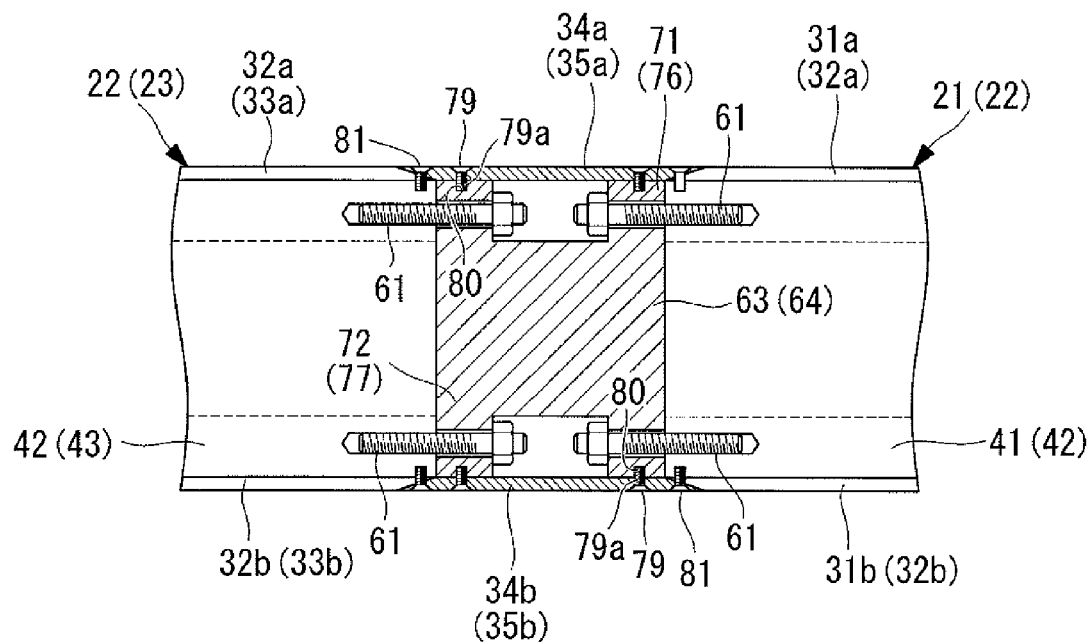
FIG. 5 is a cross-sectional view showing a state after completion of assembly of a wind turbine rotor blade according to an other embodiment of the present invention.
Figure 6:
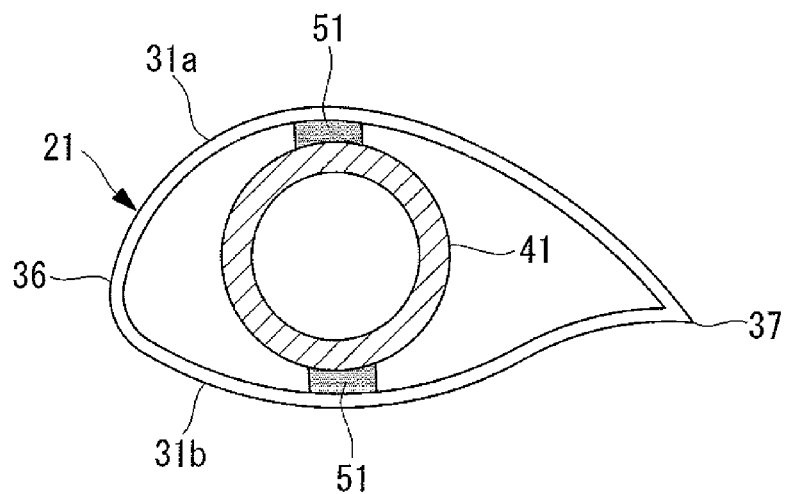
FIG. 6 is an arrow cross-sectional view taken along a line VI-VI of FIG. 2.
Figure 7:
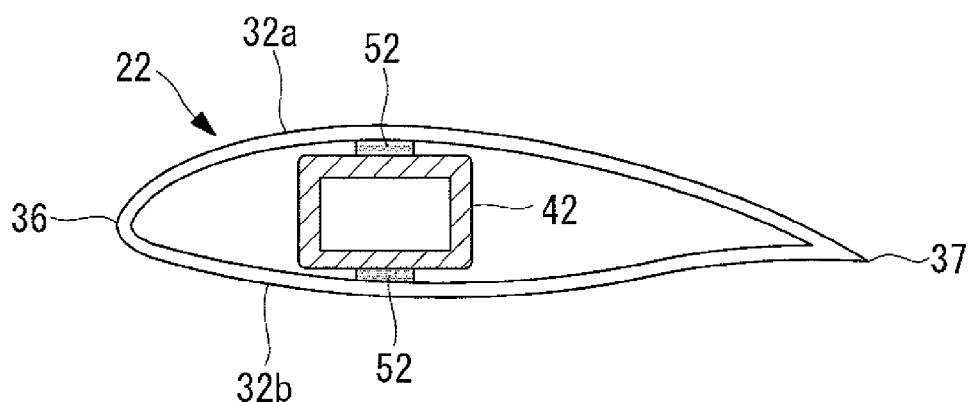
FIG. 7 is an arrow cross-sectional view taken along a line VII-VII of FIG. 2.
Figure 8:
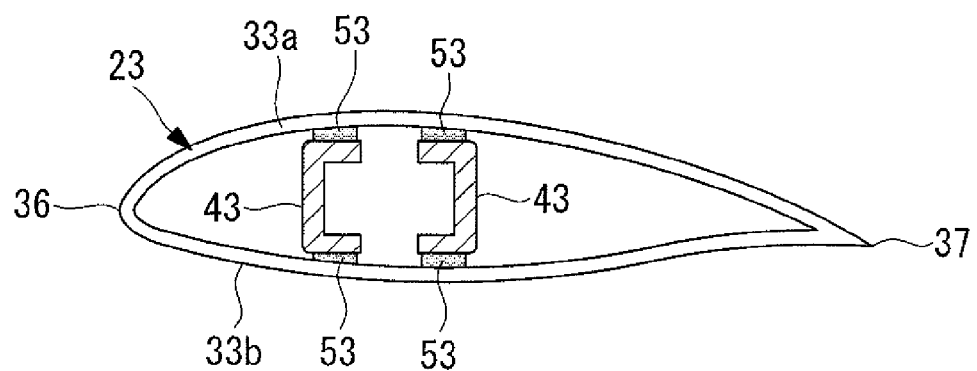
FIG. 8 is an arrow cross-sectional view taken along a line VIII-VIII of FIG. 2.

FIG. 1 is a side view showing a wind turbine for wind power generation including a wind turbine rotor blade according to the present invention; FIG. 2 is a plan view showing a state in the middle of assembly of the wind turbine rotor blade according to the embodiment; FIG. 3 is an enlarged cross-sectional view of a main part of FIG. 2; FIG. 4 is a cross-sectional view showing a state after completion of assembly of the wind turbine rotor blade according to the embodiment; FIG. 5 is a cross-sectional view showing a state after completion of assembly of a wind turbine rotor blade according to an other embodiment; FIG. 6 is an arrow cross-sectional view taken along a line VI-VI of FIG. 2; FIG. 7 is an arrow cross-sectional view taken along a line VII-VII of FIG. 2; FIG. 8 is an arrow cross-sectional view taken along a line VIII-VIII of FIG. 2; FIGS. 9(a) to 9(c) are views showing a first coupling member that couples a first main beam and a second main beam, and FIG. 9(a) is a view showing a flange shape viewed from a second main beam side, FIG. 9(b) is a side view, and FIG. 9(c) is a view showing a flange shape viewed from a first main beam side; and FIGS. 10(a) to 10(c) are views showing a second coupling member that couples the second main beam and a third main beam, and FIG. 10(a) is a view showing a flange shape viewed from a third main beam side, FIG. 10(b) is a side view, and FIG. 10(c) is a view showing a flange shape viewed from the second main beam side.

As shown in FIG. 1, a wind turbine 1 for wind power generation includes: a support post 3 that is vertically arranged on a foundation 2; a nacelle 4 installed at a top end of the support post 3; a rotor hub 5 that is provided at the nacelle 4 rotatably around a substantially horizontal axis line; and a plurality of, for example, three wind turbine rotor blades 6 radially attached around a rotational axis line of the rotor hub 5. Additionally, the force of the wind that has touched the wind turbine rotor blades 6 from a rotational axis line direction of the rotor hub 5 is converted into power that rotates the rotor hub 5 around the rotational axis line.

There are provided an anemometer 7 that measures a surrounding wind speed value, an anemoscope 8 that measures a wind direction, and a lightning rod (not shown) on a top portion of the nacelle 4.

A power generator connected to the rotor hub 5 through a coaxial gear box, although both of the power generator and the coaxial gear box are not shown, is installed inside the nacelle 4. In other words, power generator output can be obtained from the power generator by speeding up the rotation of the rotor hub 5 by the gear box to drive the power generator.

As shown in FIG. 2, the wind turbine rotor blade 6 includes: a skin 11 that defines a long hollow blade shape; and a main beam (the beam means a spur) 12 that is vertically passed in a longitudinal direction inside the skin 11, and that reinforces a strength of the skin 11, and the wind turbine rotor blade 6 is separated into at least two portions in the longitudinal direction (into three portions in the embodiment). Namely, the wind turbine rotor blade 6 includes a first blade 21, a second blade 22, and a third blade 23 that are arranged in order from a blade root side (a right side in FIG. 2) toward a blade top side (a left side in FIG. 2).

The skin 11 is comprised of: a first skin (main body skin) 31 that forms (constitutes) the first blade 21; a second skin (main body skin) 32 that forms (constitutes) the second blade 22; a third skin (main body skin) 33 that forms (constitutes) the third blade 23; a first coupling portion skin 34; and a second coupling portion skin 35.

The first skin 31, the second skin 32, the third skin 33, the first coupling portion skin 34, and the second coupling portion skin 35 are comprised of two halved bodies of a back side skin and a front side skin, respectively.

It is to be noted that when the back side skin and the front side skin need to be distinguished in the following description, a suffix "a" or "b" is attached for indication to symbols of the first skin 31, the second skin 32, the third skin 33, the first coupling portion skin 34, and the second coupling portion skin 35. Namely, the suffix "a" denotes the back side skin, and the suffix "b" denotes the front side skin.

Joint portions of the back side skin and the front side skin form a leading edge 36 and a trailing edge 37 of the wind turbine rotor blade 6. In addition, the first skin 31, the second skin 32, the third skin 33, the first coupling portion skin 34, and the second coupling portion skin 35 are formed of glass fiber reinforced plastic.

It is to be noted that as a material of the first skin 31, the second skin 32, the third skin 33, the first coupling portion skin 34, and the second coupling portion skin 35, for example, carbon fiber reinforced plastic may be used, or other materials may be used. When carbon fiber reinforced plastic with high strength and rigidity, etc. are used, the increase in size of the wind turbine rotor blade 6 can be easily dealt with.

The main beam 12 is comprised of: a first main beam 41 that forms (constitutes) the first blade 21; a second main beam 42 that forms (constitutes) the second blade 22; and a third main beam 43 that forms (constitutes) the third blade 23.

A cross-sectional shape of the first main beam 41 is a hollow cylindrical one as shown in FIG. 6, and is made to adhere to an inner surface of the first skin 31 through a first reinforcement layer 51, and a cross-sectional shape of the second main beam 42 is a hollow prismatic one as shown in FIG. 7, and is made to adhere to an inner surface of the second skin 32 through a second reinforcement layer 52. A cross-sectional shape of the third main beam 43 is a U-character one as shown in FIG. 8, and is attached to an inner surface of the third skin 33 with open portions thereof being opposed to each other.

The first main beam 41, the second main beam 42, and the third main beam 43 are formed of glass fiber reinforced plastic.

It is to be noted that as a material of the first main beam 41, the second main beam 42, and the third main beam 43, for example, carbon fiber reinforced plastic may be used, or other materials may be used. When carbon fiber reinforced plastic with high strength and rigidity, etc. are used, the increase in size of the wind turbine rotor blade 6 can be easily dealt with.

The first reinforcement layer 51 interposed between the first skin 31 and the first main beam 41, the second reinforcement layer 52 interposed between the second skin 32 and the second main beam 42, and a third reinforcement layer 53 interposed between the third skin 33 and the third main beam 43 are formed of glass fiber reinforced plastic, and are integrally configured with the corresponding skins and main beams, respectively.

It is to be noted that as a material of the first reinforcement layer 51, the second reinforcement layer 52, and the third reinforcement layer 53, for example, carbon fiber reinforced plastic may be used, or other materials may be used. When carbon fiber reinforced plastic with high strength and rigidity, etc. are used, the increase in size of the wind turbine rotor blade 6 can be easily dealt with.

In addition, in a case of a blade structure having a sufficient strength only with the skins and the main beams, the reinforcement layer 51, the reinforcement layer 52, and the reinforcement layer 53 may be configured only with resin adhesive (resin layers).

As shown in FIG. 3, the first blade 21 and the second blade 22 are jointed to each other through metallic (for example, carbon steel, high-tensile steel, stainless steel, etc.) anchor bolts (or stud bolts) 61, metallic (for example, carbon steel, high-tensile steel, stainless steel, etc.) nuts 62, and a metallic (for example, carbon steel, high-tensile steel, stainless steel, etc.) first coupling member (joint member) 63, and the second blade 22 and the third blade 23 are jointed to each other through the metallic (for example, carbon steel, high-tensile steel, stainless steel, etc.) anchor bolts 61, the metallic (for example, carbon steel, high-tensile steel, stainless steel, etc.) nuts 62, and a metallic (for example, carbon steel, high-tensile steel, stainless steel, etc.) second coupling member (joint member) 64.

The plurality of (eight in the embodiment) anchor bolts 61 are embedded along a circumferential direction in each of an end of a blade top side of the first main beam 41, ends of a blade root side and a blade top side of the second main beam 42, and an end of a blade root side of the third main beam 43 formed of glass fiber reinforced plastic respectively, in a state of being vertically arranged from an end surface of the blade top side of the first main beam 41 to an opposed end surface of the blade root side of the second main beam 42, from an end surface of the blade root side of the second main beam 42 to the opposed end surface of the blade top side of the first main beam 41, from the end surface of the blade top side of the second main beam 42 to an opposed end surface of the blade root side of the third main beam 43, and from the end surface of the blade root side of the third main beam 43 to the opposed end surface of the blade top side of the second main beam 42.

On an inner peripheral surface of the nut 62, formed is a female screw portion (not shown) that is screwed to a male screw portion (not shown) formed on an outer peripheral surface of the anchor bolt 61.

Figure 9:
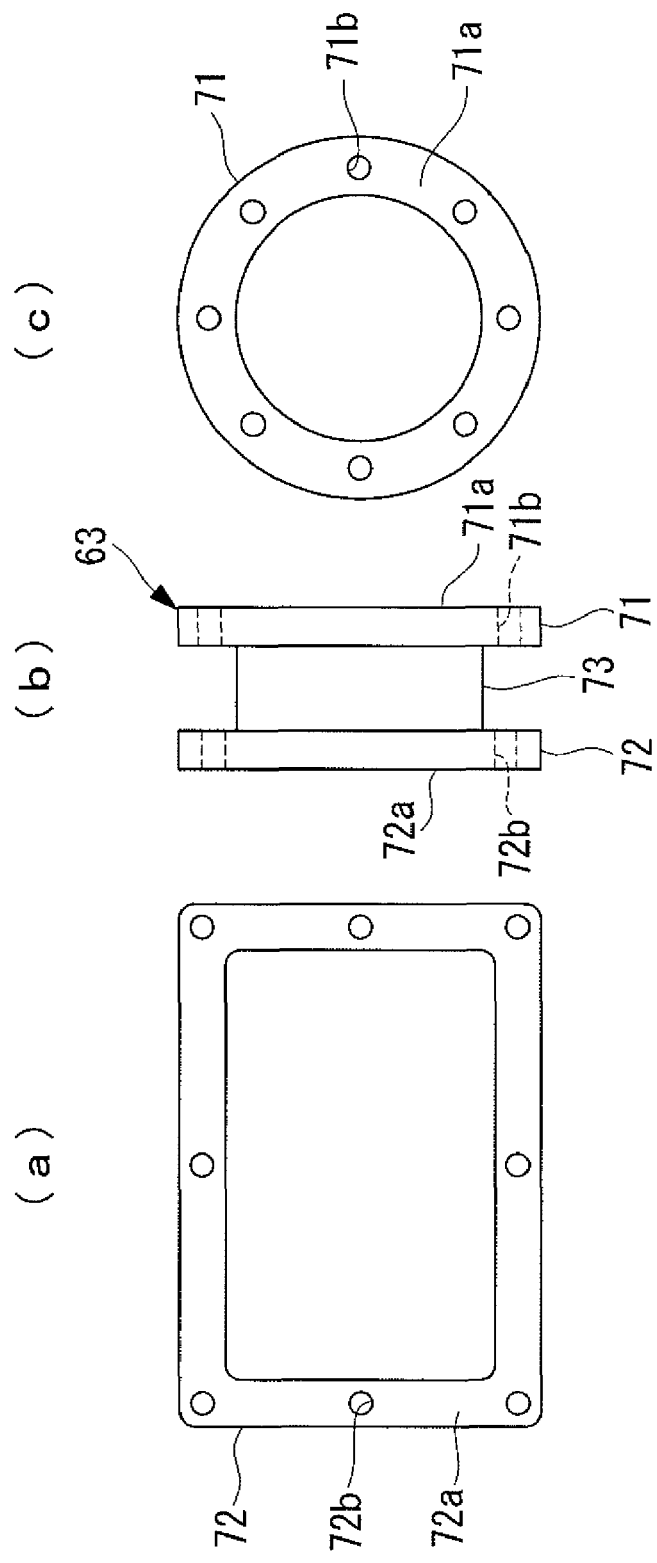
FIGS. 9(a) to 9(c) are views showing a first coupling member that couples a first main beam and a second main beam.

As shown in FIG. 9, the first coupling member 63 has a first flange portion 71 at a side jointed to the first main beam 41, an outer shape of the first flange portion 71 being a circle, and has a second flange portion 72 at a side jointed to the second main beam 42, an outer shape of the second flange portion 72 being a rectangle, and also has a connecting portion 73 that connects the first flange portion 71 and the second flange portion 72.

On an end surface of the first flange portion 71, formed is a flange surface 71a that has the same shape and the same size as the end surface of the blade top side of the first main beam 41, and that is closely attached to the whole end surface of the blade top side of the first main beam 41. At the first flange portion 71, a through hole 71b which penetrates in a board thickness direction, and into which the corresponding anchor bolt 61 is inserted is provided along the circumferential direction at equal intervals (45-degree interval in the embodiment) at a position corresponding to the anchor bolt 61 vertically arranged on the end surface of the blade top side of the first main beam 41.

On an end surface of the second flange portion 72, formed is a flange surface 72a that has the same shape and the same size as the end surface of the blade root side of the second main beam 42, and that is closely attached to the whole end surface of the blade root side of the second main beam 42. At the second flange portion 72, a through hole 72b which penetrates in the board thickness direction, and into which the corresponding anchor bolt 61 is inserted is provided along the circumferential direction at a position corresponding to the anchor bolt 61 vertically arranged on the end surface of the blade root side of the second main beam 42.

Figure 10:
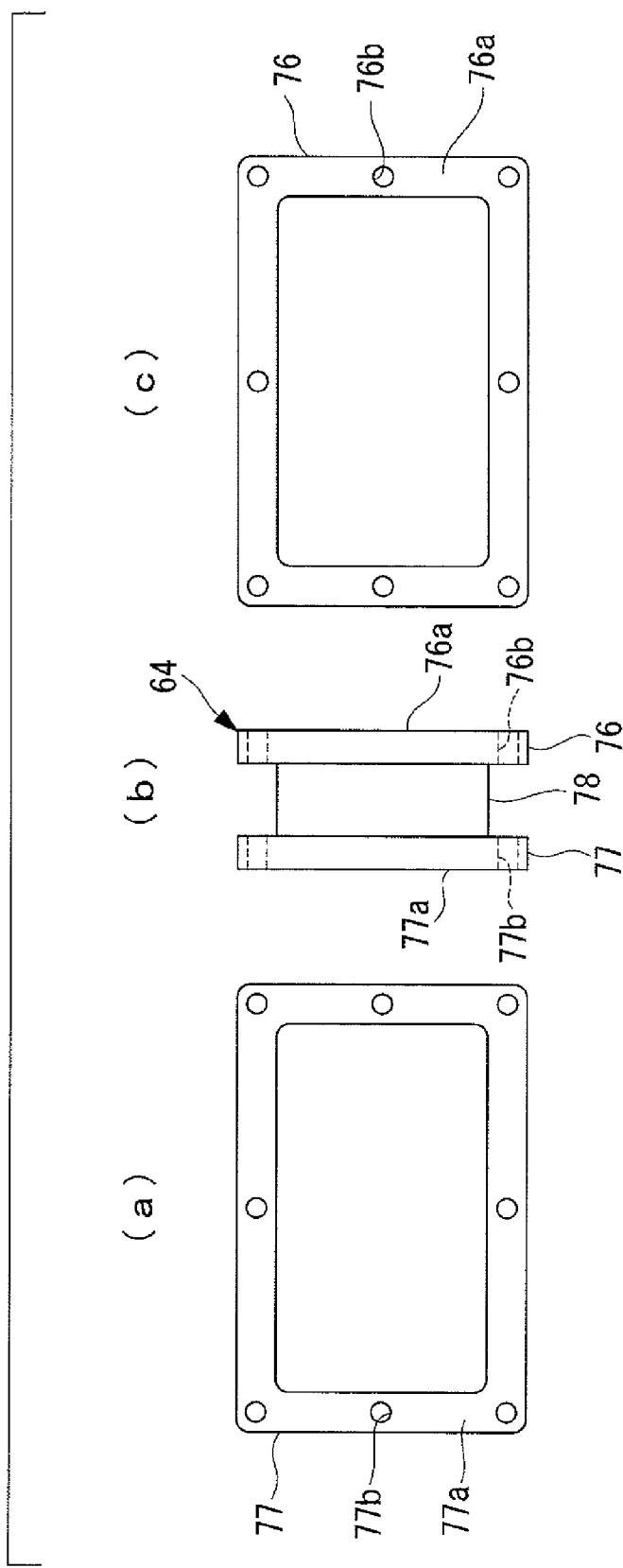
FIGS. 10(a) to 10(c) are views showing a second coupling member that couples the second main beam and a third main beam.

As shown in FIG. 10, the second coupling member 64 has a first flange portion 76 at a side jointed to the second main beam 42, an outer shape of the first flange portion 76 being a rectangle, and has a second flange portion 77 at a side jointed to the third main beam 43, an outer shape of the second flange portion 77 being a rectangle, and also has a connecting portion 78 that connects the first flange portion 76 and the second flange portion 77.

On an end surface of the first flange portion 76, formed is a flange surface 76a that has the same shape and the same size as the end surface of the blade top side of the second main beam 42, and that is closely attached to the whole end surface of the blade top side of the second main beam 42. At the first flange portion 76, a through hole 76b which penetrates in the board thickness direction, and into which the corresponding anchor bolt 61 is inserted is provided along the circumferential direction at a position corresponding to the anchor bolt 61 vertically arranged on the end surface of the blade top side of the second main beam 42.

On an end surface of the second flange portion 77, formed is a flange surface 77a that has the same shape and the same size as an end surface of a blade top side of the third main beam 43, and that is closely attached to the whole end surface of the blade root side of the third main beam 43. At the second flange portion 77, a through hole 77b which penetrates in the board thickness direction, and into which the corresponding anchor bolt 61 is inserted is provided along the circumferential direction at a position corresponding to the anchor bolt 61 vertically arranged on the end surface of the blade root side of the third main beam 43.

Additionally, as shown in FIG. 4 or 5, on back surfaces (top surfaces) of the first flange portion 71 (76) and the second flange portion 72 (77) that contact an inner surface of the back side coupling portion skin 34a (35a) when the back side coupling portion skin 34a (35a) is attached, and on front surfaces (bottom surfaces) of the first flange portion 71 (76) and the second flange portion 72 (77) that contact an inner surface of the front side coupling portion skin 34b (35b) when the front side coupling portion skin 34b (35b) is attached, respectively, provided is at least one recess 80 that receives a tip of a countersunk screw (fastening member) 79 that fixes (mounts) the back side coupling portion skin 34a (35a) and the front side coupling portion skin 34b (35b). On an inner peripheral surface of the recess 80, formed is a female screw portion (not shown) that is screwed to a male screw portion 79a formed on an outer peripheral surface of the tip of the countersunk screw 79.

It is to be noted that in a blade shown in FIG. 4, an adhesive (not shown) is applied to a surface contact portion (place) of the inner surface of the back side coupling portion skin 34a (35a) and the back surfaces of the first flange portion 71 (76) and the second flange portion 72 (77), to a surface contact portion (place) of the inner surface of the back side coupling portion skin 34a (35a), an outer surface of a back side first skin 31a, an outer surface of a back side second skin 32a, and an outer surface of a back side third skin 33a, to a surface contact portion (place) of the inner surface of the front side coupling portion skin 34b (35b) and front surfaces of the first flange portion 71 (76) and the second flange portion 72 (77), and to a surface contact portion (place) of the inner surface of the front side coupling portion skin 34b (35b), an outer surface of a front side first skin 31b, an outer surface of a front side second skin 32b, and an outer surface of a front side third skin 33b.

Meanwhile, in a blade shown in FIG. 5, both ends of the back side coupling portion skin 34a (35a) and both ends of the front side coupling portion skin 34b (35b) are pressed (fixed) through a countersunk screw (fastening member) 81 against (to) the end of the blade top side of the first main beam 41, the ends of the blade root side and the blade top side of the second main beam 42, and the end of the blade root side of the third main beam 43. In addition, similarly to the blade shown in FIG. 4, in the blade shown in FIG. 5, an adhesive (not shown) is applied to the surface contact portion (place) of the inner surface of the back side coupling portion skin 34a (35a) and the back surfaces of the first flange portion 71 (76) and the second flange portion 72 (77), to the surface contact portion (place) of the inner surface of the back side coupling portion skin 34a (35a), the outer surface of the back side first skin 31a, the outer surface of the back side second skin 32a, and the outer surface of the back side third skin 33a, to the surface contact portion (place) of the inner surface of the front side coupling portion skin 34b (35b) and the front surfaces of the first flange portion 71 (76) and the second flange portion 72 (77), and to the surface contact portion (place) of the inner surface of the front side coupling portion skin 34b (35b), the outer surface of the front side first skin 31b, the outer surface of the front side second skin 32b, and the outer surface of the front side third skin 33b.

According to the wind turbine rotor blade 6 according to the embodiment, since the beams 31, 32, and 33, which are main strength members of the separated blades 21, 22, and 23, are coupled to each other by the metallic coupling members 63 and 64, a sufficient strength in the coupling portion can be secured without significant increase in weight even though the blade is increased in size.

According to the wind turbine rotor blade 6 according to the embodiment, the first blade 21, the second blade 22, the third blade 23, the first coupling portion skin 34, the second coupling portion skin 35, the first coupling member 63, and the second coupling member 64 molded (manufactured) in a factory are separately carried into (conveyed to) an installation site of the wind turbine 1 for wind power generation, or they are separately carried into (conveyed to) the installation site of the wind turbine 1 for wind power generation in a state where the first coupling member 63 has been attached to the first blade 21 or the second blade 22, and the second coupling member 64 has been attached to the second blade 22 or the third blade 23.

As a result of this, securing of conveyance vehicles, selection of conveyance routes, etc. become easy, efficient conveyance can be performed, and thus reduction of working hours for conveyance and reduction in conveyance cost can be achieved.

Further, according to the wind turbine rotor blade 6 according to the embodiment, since the end of the blade top side of the first main beam 41 of the first blade 21 and the end of the blade root side of the second main beam 42 of the second blade 22 carried into the installation site are easily coupled (assembled) to each other through the first coupling member 63 coupled by bolts and nuts, and the end of the blade top side of the second main beam 42 of the second blade 22 and the end of the blade root side of the third main beam 43 of the third blade 23 are easily coupled (assembled) to each other through the second coupling member 64 coupled by bolts and nuts, maintainability, such as ease of assembly and disassembly, can be improved.

Furthermore, according to the wind turbine rotor blade 6 according to the embodiment, since end surface shapes of the first flange portions 71 and 76 and the second flange portions 72 and 77 are respectively the same as opposed end surface shapes of the end of the blade top side of the first main beam 41, the ends of the blade root side and the blade top side of the second main beam 42, and the end of the blade root side of the third main beam 43, the coupling members 63 and 64, and the corresponding end of the blade top side of the first main beam 41, ends of the blade root side and the blade top side of the second main beam 42, and end of the blade root side of the third main beam 43 are smoothly connected to each other, and thus a load can be transmitted efficiently.

Furthermore, according to the wind turbine rotor blade 6 according to the embodiment, since the coupling portion skins 34 and 35 are firmly fixed to the back surfaces and the front surfaces of the first flange portions 71 and 76 and the second flange portions 72 and 77 through the countersunk screw 79, or to the back surfaces and the front surfaces of the first flange portions 71 and 76 and the second flange portions 72 and 77, a back surface and a front surface of the first beam 41, a back surface and a front surface of the second beam 42, and a back surface and a front surface of the third beam 43 through the countersunk screws 79 and 81, detachment of the coupling portion skins 34 and 35 can be prevented.

According to the wind turbine 1 for wind power generation according to the present invention, since the wind turbine rotor blade 6 that can prevent breakage in the coupling portions is included, the increase in size of the wind turbine rotor blade 6 along with the increase in size of the wind turbine 1 for wind power generation can also be dealt with.

It is to be noted that the present invention is not limited to the above-mentioned embodiment, and that various changes and modifications can be made without departing from the scope of the present invention.

Figure 11:
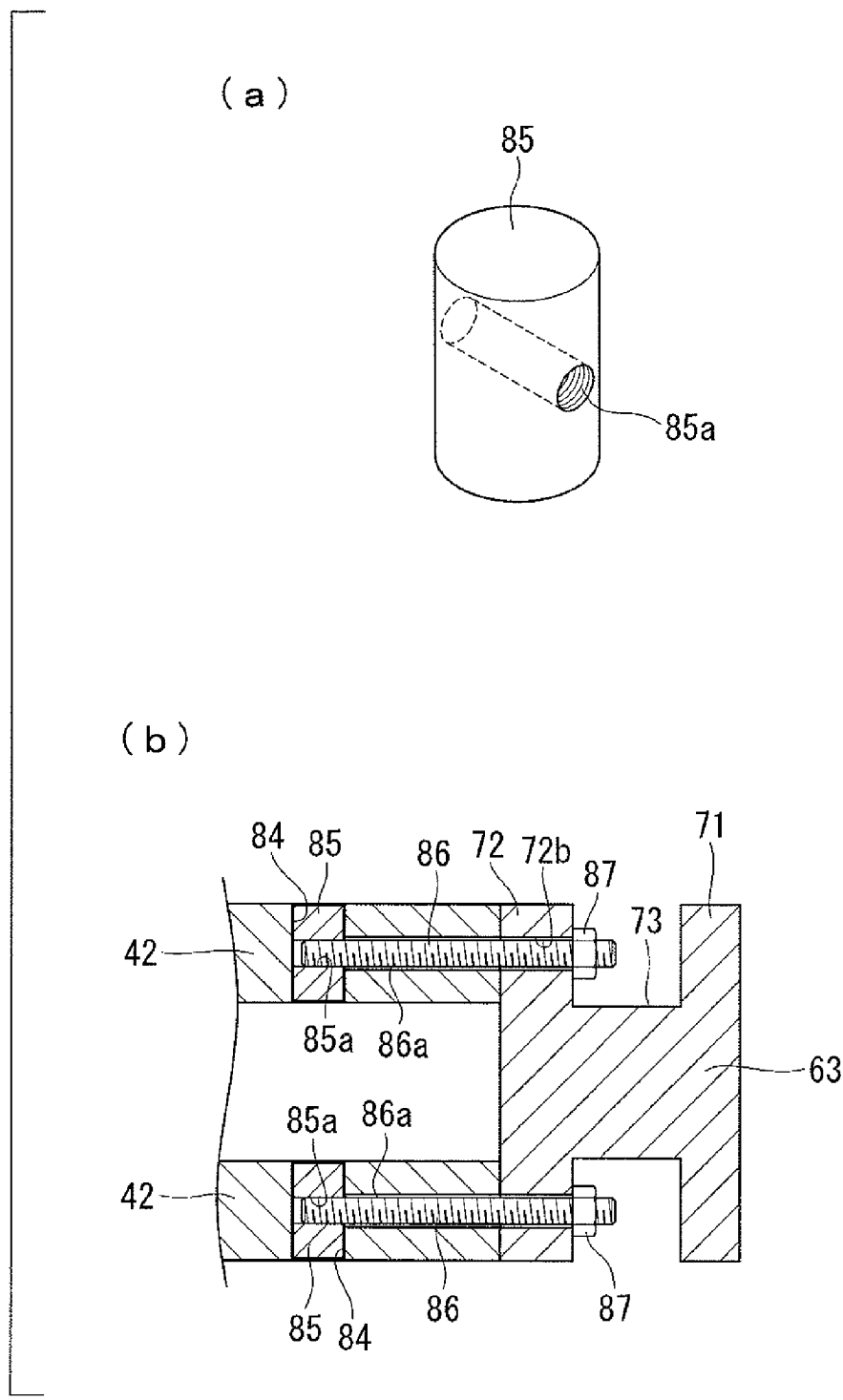
FIGS. 11(a) and 11(b) are views for illustrating a coupling method according to another embodiment of the present invention.

For example, the present invention may be configured as follows. At the end of the blade top side of the first main beam 41, the ends of the blade root side and the blade top side of the second main beam 42, and the end of the blade root side of the third main beam 43 molded (manufactured) as the first main beam 41, the second main beam 42, and the third main beam 43, and also at positions corresponding to the through holes 71*b*, 72*b*, 76*b*, and 77*b*, opened is a prepared hole 84 (refer to FIG. 11(*b*)) which is made of metal (for example, carbon steel, high-tensile steel, stainless steel, etc.), and in which a nut 85 of a solid cylindrical shape is housed as shown in FIGS. 11(*a*) and 11(*b*) along a direction perpendicular to the longitudinal direction of the main beams 41, 42, and 43. The nut 85 is previously embedded in this prepared hole 84. Before attaching (fixing) the coupling members 63 and 64 to the end of the blade top side of the first main beam 41, the ends of the blade root side and blade top side of the second main beam 42, and the end of the blade root side of the third main beam 43, a male screw portion 86*a* formed on an outer peripheral surface of one end of an anchor bolt (or stud bolt) 86 is screwed into a female screw portion 85*a* formed on an inner peripheral surface of a through hole provided in a center of a height direction and a width direction of the nut 85, and an other end of the anchor bolt 86 is inserted into the through holes 71*b* and 72*b* of the first coupling member 63, and the through holes 76*b* and 77*b* of the second coupling member 64. Subsequently, a nut 87 having a female screw portion (not shown) that is screwed to the male screw portion 86*a* is screwed into the male screw portion 86*a* formed on an outer peripheral surface of the other end of the anchor bolt 86, and thereby the coupling members 63 and 64 are attached (fixed).

It is to be noted that FIG. 11(*b*) shows a state where the first coupling member 63 has been attached (fixed) to the end of the blade root side of the second main beam 42.

In addition, the nut 85 can be reliably fixed to the prepared hole 84 by inserting (interposing) an adhesive (resin) in a space between the nut 85 and the prepared hole 84, and thus coming-away of the nut 85 from the prepared hole 84 can be prevented reliably.

Figure 12:
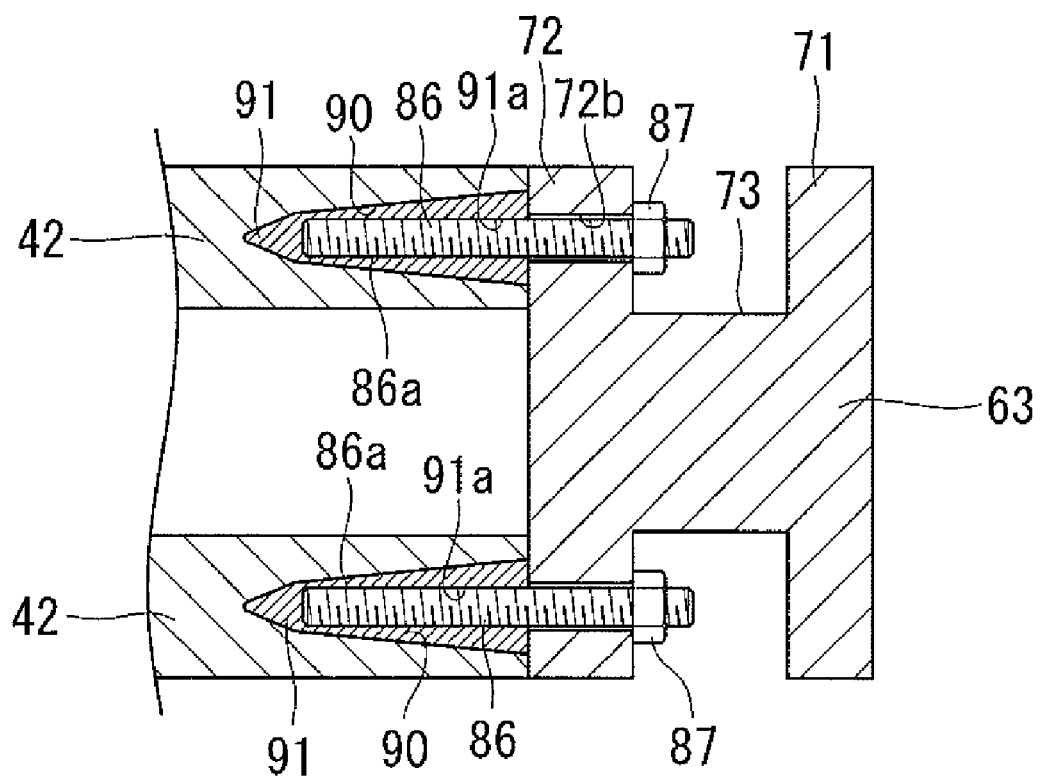
FIG. 12 is a view for illustrating a coupling method according to still another embodiment of the present invention, and it is an enlarged cross-sectional view showing a main part.

The present invention may be configured as follows. At the end of the blade top side of the first main beam 41, the ends of the blade root side and the blade top side of the second main beam 42, and the end of the blade root side of the third main beam 43 molded (manufactured) as the first main beam 41, the second main beam 42, and the third main beam 43, and also at the positions corresponding to the through holes 71*b*, 72*b*, 76*b*, and 77*b*, opened is a prepared hole 90 which is made of metal (for example, carbon steel, high-tensile steel, stainless steel, etc.), and in which an insert member 91 of an elongated (substantially) conical shape is housed as shown in FIG. 12 along the longitudinal direction of the main beams 41, 42, and 43. The insert member 91 is previously embedded in (screwed into) this prepared hole 90. Before attaching (fixing) the coupling members 63 and 64 to the end of the blade top side of the first main beam 41, the ends of the blade root side and blade top side of the second main beam 42, and the end of the blade root side of the third main beam 43, the male screw portion 86*a* formed on the outer peripheral surface of the one end of the anchor bolt (or stud bolt) 86 is screwed into a female screw portion 91*a* formed on an inner peripheral surface of a bolt hole provided along the longitudinal direction of the insert member 91, and the other end of the anchor bolt 86 is inserted into the through holes 71*b* and 72*b* of the first coupling member 63, and the through holes 76*b* and 77*b* of the second coupling member 64. Subsequently, the nut 87 having the female screw portion (not shown) that is screwed to the male screw portion 86*a* is screwed into the male screw portion 86*a* formed on the outer peripheral surface of the other end of the anchor bolt 86, and thereby the coupling members 63 and 64 are attached (fixed).

It is to be noted that FIG. 12 shows the state where the first coupling member 63 has been attached (fixed) to the end of the blade root side of the second main beam 42.

A male screw portion (not shown) is formed on an outer peripheral surface of the insert member 91, and this male screw portion bites into (bites at) an inner peripheral surface of the prepared hole 90, and thereby the insert member 91 does not easily come away from the prepared hole 90.

Further, the insert member 91 can be reliably fixed to the prepared hole 90 by inserting (interposing) an adhesive (resin) in a space between the insert member 91 and the prepared hole 90, and thus coming-away of the insert member 91 from the prepared hole 90 can be prevented reliably.

The nut 85 as shown in FIG. 11 or the insert member 91 as shown in FIG. 12 are previously embedded in the end of the blade top side of the first main beam 41, the ends of the blade root side and the blade top side of the second main beam 42, and the end of the blade root side of the third main beam 43, whereby coming-away of the anchor bolt 86 in an axial direction (the longitudinal direction of the wind turbine rotor blade 6) can be prevented more reliably, and reliability of the wind turbine rotor blade 6 can be further improved.

Figure 13:
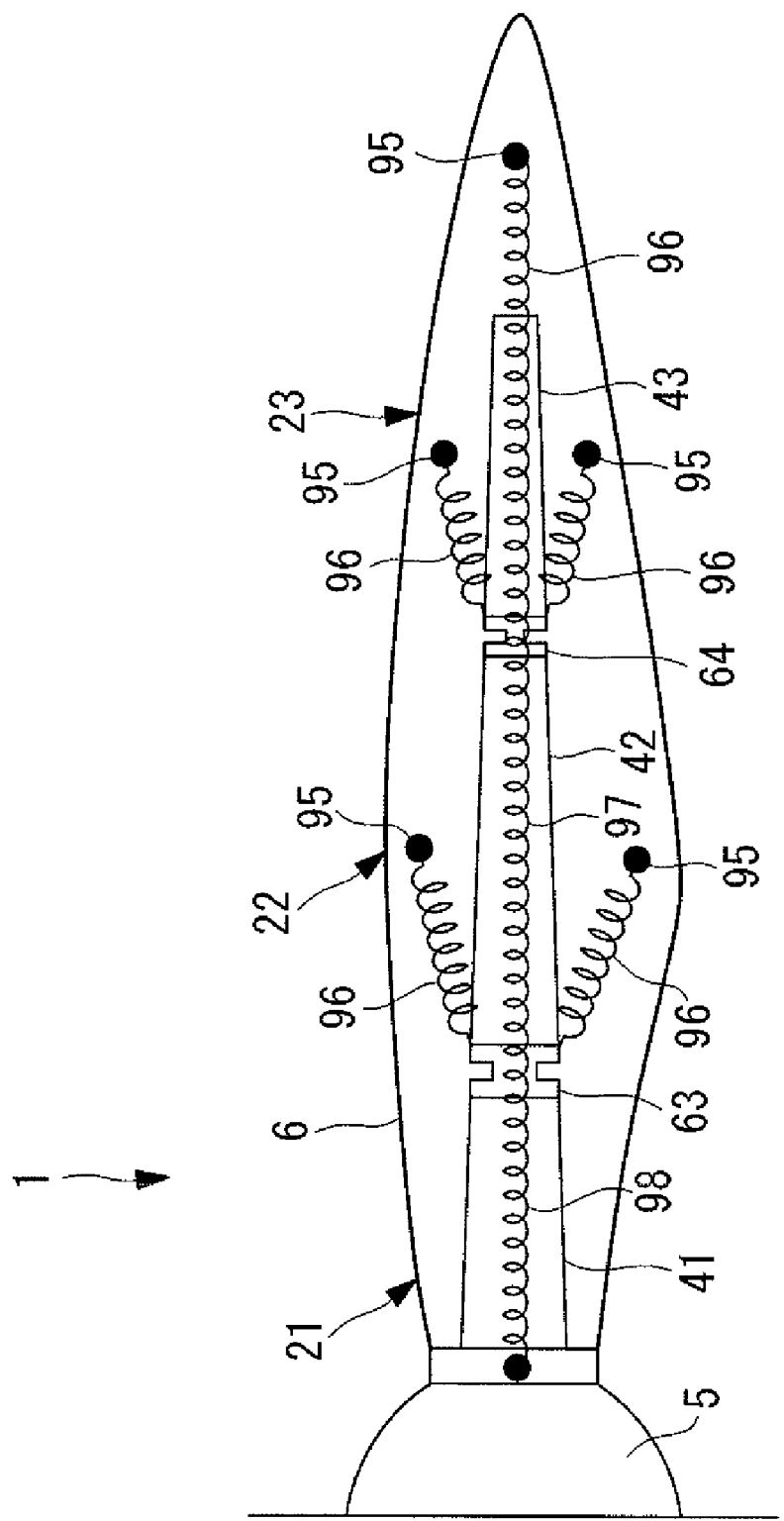
FIG. 13 is a plan view for illustrating a wind turbine rotor blade according to yet still another embodiment of the present invention.

Further, as shown in FIG. 13, it is more preferred that a metallic lightning receiving piece (receptor) 95 arranged at a tip and/or a back surface and/or a front surface of the wind turbine rotor blade 6, and the coupling members 63 and 64 be connected to each other by a conductive cable 96, the first coupling member 63 and the second coupling member 64 be connected to each other by a (first) down conductor 97, and that the first coupling member 63 and the rotor hub 5 be connected to each other by a (second) down conductor 98.

Since the rotor hub 5 is further electrically grounded through a slip ring, a bearing, a tower, etc., which are not shown, eliminated is a potential difference between the air around the wind turbine rotor blade 6 and the ground on which the foundation 2 is installed, and thereby the wind turbine is not easily struck by lightning, and additionally, even when the wind turbine is struck by lightning, the conductive cable 96, the down conductors 97 and 98, and a grounding conductor serve as a passage for a current, and damage of the wind turbine rotor blade 6 and the wind turbine 1 for wind power generation can be prevented. In addition, a circuit can be formed easily and reliably at the time of coupling the blades by using the coupling members 63 and 64 as electric contact points of the separated respective blades.

Further, in this case, it is preferred that the metallic lightning receiving piece (receptor) 95, the conductive cable 96, the coupling members 63 and 64, and the down conductors 97 and 98 be covered with resin etc. with respect to an internal space of a blade, or be coated with a paint for insulation, because a lightning current does not easily flow outside the circuit.

{Reference Signs List}
1 Wind turbine for wind power generation
5 Rotor hub
6 Wind turbine rotor blade
11 Skin
12 Main beam (beam)
21 First blade
22 Second blade
23 Third blade
31 First skin (main body skin)
32 Second skin (main body skin)
33 Third skin (main body skin)
34 First coupling portion skin
35 Second coupling portion skin
41 First main beam (beam)
42 Second main beam (beam)
43 Third main beam (beam)
61 Anchor bolt
62 Nut
63 First coupling member
64 Second coupling member
71 First flange portion
72 Second flange portion
73 Connecting portion
76 First flange portion
77 Second flange portion
78 Connecting portion
79 Countersunk screw (fastening member)
81 Countersunk screw (fastening member)
85 Nut
86 Anchor bolt
87 Nut
91 Insert member
95 Metallic lightning receiving piece
96 Conductive cable
97 First down conductor
98 Second down conductor

The invention claimed is:

1. A wind turbine rotor blade comprising:
a skin that forms a long hollow shape; and a beam that is vertically passed in a longitudinal direction to reinforce the skin from inside, the wind turbine rotor blade being also radially attached around a rotational axis line of a rotor hub, wherein
the beam is separated into at least two portions in the longitudinal direction,
ends of the adjacent beams are coupled to each other through a metallic coupling member having: a first flange portion opposed to one end; a second flange portion opposed to another end; and a connecting portion that connects the first flange portion and second flange portion, and
the skin is separated into a coupling portion skin arranged at a position corresponding to the coupling member, and a main body skin arranged at a position corresponding to the beam.

2. The wind turbine rotor blade according to claim 1, wherein the coupling member is coupled to the corresponding end of the beam through a plurality of bolts fixed to the ends of the beams, and nuts screwed to these bolts.

3. The wind turbine rotor blade according to claim 1, wherein end surface shapes of the first flange portion and the second flange portion are the same as opposed end surface shapes of the beams, respectively.

4. The wind turbine rotor blade according to claim 1, wherein more than half of cross-sectional shapes of the separated beams in the longitudinal direction are the same as or similar to each other.

5. The wind turbine rotor blade according to claim 2, wherein one end of the bolt is coupled through the nut or an insert member embedded in the end of the beam.

6. The wind turbine rotor blade according to claim 1, wherein the coupling portion skin is fixed to back surfaces and front surfaces of the first flange portion and the second flange portion through a fastening member.

7. The wind turbine rotor blade according to claim 1, wherein the coupling portion skin is fixed to the back surfaces and the front surfaces of the first flange portion and the second flange portion, and to a back surface and a front surface of the beam through a fastening member.

8. The wind turbine rotor blade according to claim 1, wherein a metallic lightning receiving piece arranged at a back surface and/or a front surface of the skin and the coupling member are connected to each other by a conductive cable, and the coupling member and the coupling member are connected to each other by a first down conductor, and also the coupling member and the rotor hub are connected to each other by a second down conductor.

9. A wind turbine for wind power generation comprising the wind turbine rotor blade according to claim 1.

* * * * *